United States Patent
Schaude

(10) Patent No.: US 12,450,194 B1
(45) Date of Patent: Oct. 21, 2025

(54) ENABLING PAGING FOR OBJECTS TO BE ARCHIVED

(71) Applicant: SAP SE, Walldorf (DE)

(72) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/882,508

(22) Filed: Sep. 11, 2024

(51) Int. Cl.
*G06F 16/11* (2019.01)
*G06F 16/14* (2019.01)
*G06F 16/174* (2019.01)

(52) U.S. Cl.
CPC ............ *G06F 16/113* (2019.01); *G06F 16/14* (2019.01); *G06F 16/1748* (2019.01)

(58) Field of Classification Search
CPC ..... G06F 16/113; G06F 16/14; G06F 16/1748
See application file for complete search history.

(56) References Cited

U.S. PATENT DOCUMENTS

2014/0359238 A1* 12/2014 Imazaki ............. C09K 5/16
711/171

* cited by examiner

*Primary Examiner* — Tyler J Torgrimson
(74) *Attorney, Agent, or Firm* — SCHWEGMAN LUNDBERG & WOESSNER, P.A.

(57) ABSTRACT

A paging mechanism is provided for objects that are to be archived. An archiving component keeps track of the number of objects for which it has determined it is not allowed to archive (here called the paging amount). When a request to archive data is received by the archiving component, rather than necessarily attempt to archive the oldest objects, the archiving component instead skips a number of the oldest objects equal to the paging amount. The archiving component is invoked (e.g., each day), and then the paging amount can change based on the paging amount from the prior period (e.g., yesterday) and the newly requested objects to be archived that it determines are not allowed to be archived.

20 Claims, 4 Drawing Sheets

ENABLING PAGING FOR OBJECTS TO BE ARCHIVED

BACKGROUND

Data archiving is the process of moving data that is no longer actively used to a separate storage device for long-term retention. Data may be archived for several reasons, such as for regulatory compliance. Data archives may be indexed and have search capabilities so that archived data can be located and retrieved.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
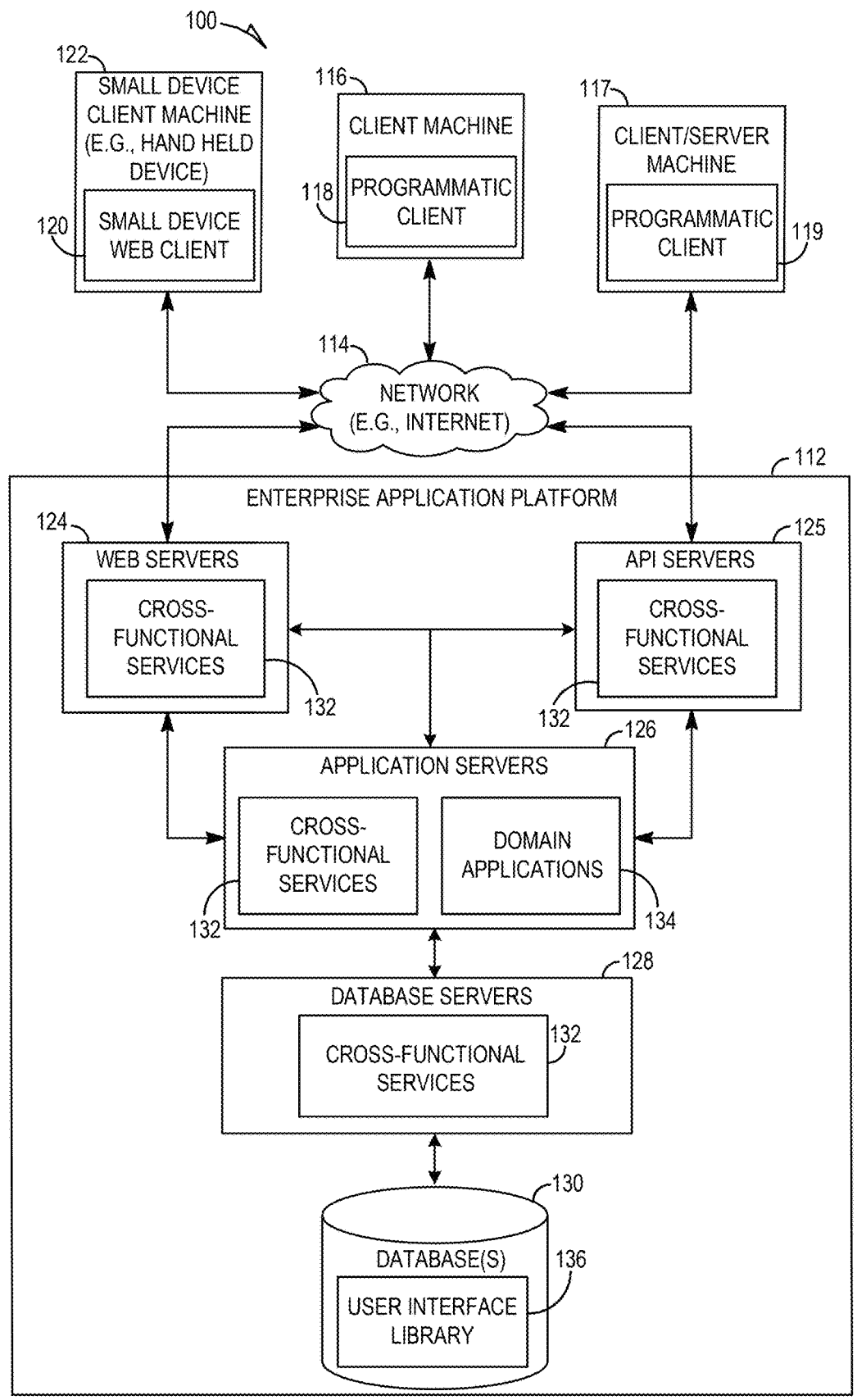
FIG. 1 is an example network diagram illustrating a system, in accordance with an example embodiment.

Example methods and systems of implementing access control for archived objects are disclosed. In the following description, for purposes of explanation, numerous specific details are set forth in order to provide a thorough understanding of example embodiments. It will be evident, however, to one skilled in the art that the present embodiments can be practiced without these specific details.

A technical problem can be encountered when archiving large amounts of data, and specifically with certain types of data or systems. Data may be stored in a database. Typically, when data is archived, an automated process is undertaken to periodically archive data older than a certain amount of time (e.g., daily an archive process may be run to archive data older than two years old). The "older than" in this context could mean "was last updated," although other interpretations (e.g., "was created") are also possible. Once an object is archived, it is deleted from the database and instead only exists in the archive (which technically may be its own database, but for ease of differentiation in the present disclosure may be referred to as simply an archive).

When that archiving process take place (e.g. daily), a request is sent to an archiving component to initiate the archiving process. This request includes an indication of the objects that are being requested to be archived (here, for example, that would be an indication of the objects in the database that are older than two years old).

There are certain circumstances, however, where an object to be archived should not actually be archived (herein referred to as being "not allowed to be archived"). This could be for several reasons. One possible reason is that the object is still in active use, or at least is believed to be in active use. Where the object is, for example, a ticket indicating a technical problem or issue that still needs to be resolved, if the ticket is still "open", then it should probably not be archived as that would remove it from the database where it can be easily accessed, and not all users may have access to the archive. In other instances, there is something in the object itself that indicates that it should not be archived for a certain period of time, such as if the document is a warranty document describing a 10-year warranty on a piece of manufacturing equipment—in such an instance the warranty document should not be archived until the 10-year warranty period has expired.

Unfortunately, in some circumstances, objects are interpreted as being "not allowed to be archived" when they actually should be allowed to be archived. One such example is that it is fairly common for users to accidentally forget to officially close out a ticket once the ticket has been resolved, leaving the ticket in an open state if though it should be in a closed state.

Archiving large amounts of objects is resource intensive, and thus it is common for archiving components to have limits on the amount of objects that can be archived in response to any one request. For example, there may be a limit of one hundred thousand objects archived per day. Requests to archive documents typically organize the objects to be archived by date, since the dates of the objects need to be sorted in order to find out if they need to archive them in the first place (since typically only objects older than a certain time period are archived). The result is that the archiving component typically tries to archive the oldest x objects in a list of possible objects to archive, with x being the archiving component's limit As the number of objects that are not allowed to be archived grows, however, the number of objects the archiving component actually archives in response to a request shrinks more and more. As mentioned before, many of the objects that are not allowed to be archived are incorrectly labeled that way, such as from a user forgetting to close out a ticket. Since those objects never get archived, yet become older and older each day, the result is a situation where some, most, or even all of the requested objects to be archived actually can't be archived. For example, if there are one hundred and fifty thousand open tickets in a database and the archiving components limit is one hundred thousand, then eventually there is a scenario (once at least one hundred thousand of the open tickets are older than the archiving period of time, e.g. two years) where the archiving component is trying to archive one hundred thousand older objects but yet archives none of them because all of those hundred thousand objects are labeled as "not allowed to be archived."

The result is a kind of starvation, where objects that are archivable and old enough to be archived wind up not getting archived because the requests are clogged with objects that are even older and yet are not allowed to be archived (and thus are never archived and never deleted from the database).

In an example embodiment, a paging mechanism is provided for objects that are to be archived. An archiving component keeps track of the number of objects for which it has determined it is not allowed to archive (here called the paging amount). When a request to archive data is received by the archiving component, rather than necessarily attempt to archive the oldest objects, the archiving component instead skips a number of the oldest objects equal to the paging amount. The archiving component is invoked (e.g., each day), and then the paging amount can change based on the paging amount from the prior period (e.g., yesterday) and the newly requested objects to be archived that it determines are not allowed to be archived. Once it gets to a point where the archiving component actually archives all of the objects to be archived that particular period (e.g., none of the objects to be archived today were labeled as "do not archive"), then the paging amount resets, allowing for the possibility that some of the older objects are not available to be archived.

FIG. 1 is an example network diagram illustrating a system 100, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
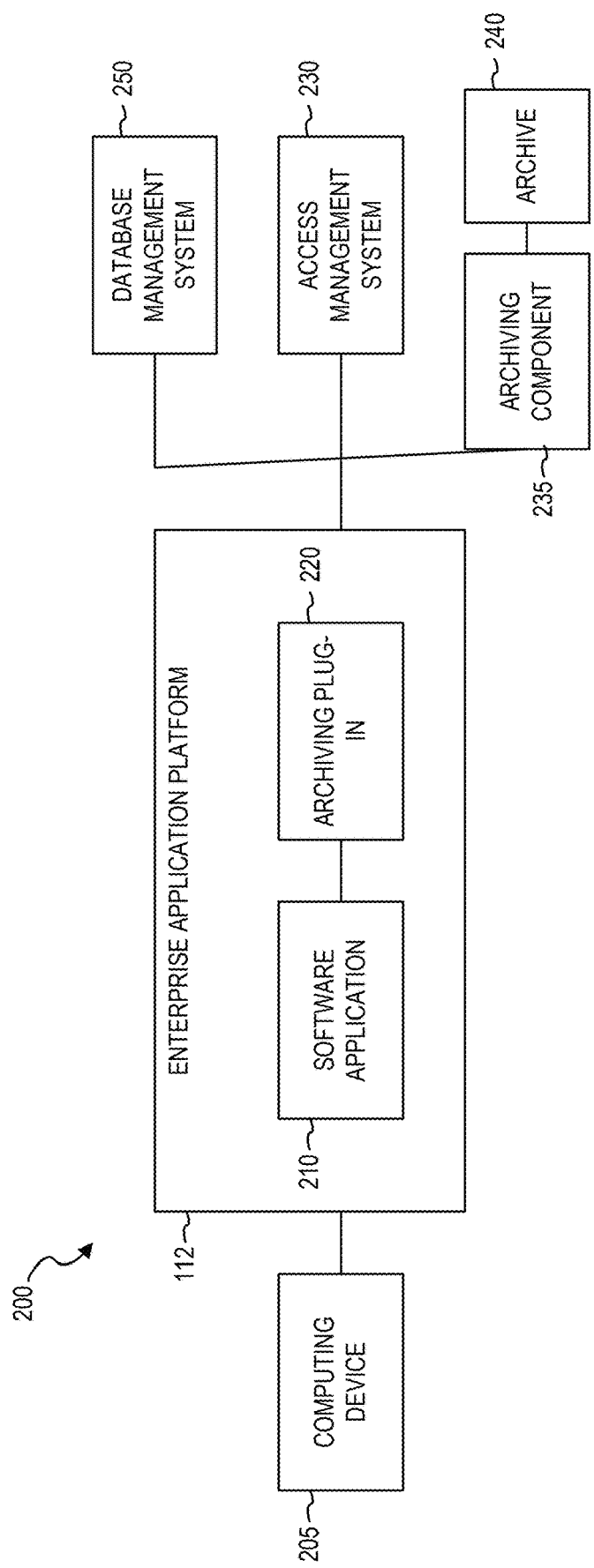
FIG. 2 is a block diagram illustrating an example archiving system, in accordance with an example embodiment.

FIG. 2 is a block diagram illustrating an example archiving system 200, in accordance with an example embodiment. The archiving system 200 may be configured to implement archiving of objects in a database, such as database 130. In some example embodiments, the archiving system 200 may comprise any combination of one or more of a software application 210, an archiving plug-in 220, an access management system 230, an archiving component 235 and an archive 240. The components shown in FIG. 2 may be configured to communicate with each other via one or more network connections, such as via the network 114 in FIG. 1. In some example embodiments, one or more of the components of the archiving system 200 may be implemented by the enterprise application platform 112 of FIG. 1. For example, the software application 210 and the archiving plug-in 220 may be incorporated into the enterprise application platform 112. The access management system 230, archiving component 235, and the archive 240 may also be incorporated into the enterprise application platform 112, or, alternatively, may be incorporated into a separate computer system.

The software application 210 may comprise an enterprise application. An enterprise application is a large software system platform designed to operate in an organization, such as business or government. Enterprise applications may comprise a group of programs with shared business applications and organizational modeling utilities, and they may be developed using enterprise architecture. Enterprise applications may be configured to provide services including, but not limited to, online shopping and payment processing, interactive product catalogs, computerized billing systems, content management, information technology service management, enterprise resource planning, business intelligence, human resource management, manufacturing, application integration, forms automation, sales force automation, and business process management.

In some example embodiments, the software application 210 may be configured to create objects, such as in response to instructions or input provided by a user of a computing device 205 accessing the software application 210. The objects may comprise entities within a multi-tiered software application that works in conjunction with data access and domain logic layers to transport data. One example of such an object is a business object. A business object may comprise a container for application data, such as a customer or an invoice. Data may be exchanged between software components by business objects. A business object may contain fields that have a name, a type (e.g., a scalar type or another business object), a default value (e.g., for scalar types), and cardinality. Other types of objects are also within the scope of the present disclosure.

The data of objects created via the software application 210 may have an original format. For example, upon creation, the objects may have an Extensible Markup Language (XML) format or a JavaScript® Object Notation (JSON) format. Other types of formats are also within the scope of the present disclosure. The data of these objects may be stored in a database within a database management system 250. In some example embodiments, this data may be archived. For example, the database management system 250, or some other component of the archive access system 200, may move the data from the database of the database management system 250 to the archive 240. The archive 240 may comprise a storage device that is separate from the database of the database management system 250. The archived data may be stored in the archive 240 in a first format that is configured specifically for data archival. For example, the archived data may be stored in a binary large object (BLOB) format. BLOB is a data type that can store binary objects or data. BLOB may comprise a collection of binary data stored as a single entity. Other types of formats may be used for the first format of the archived data.

The archiving plug-in 220 may comprise a plug-in, or some other software component, that provides additional functionality to the software application 210. The archiving plug-in 220 may enable effective and efficient access control to the archive 240. By connecting the archiving plug-in 220 to the software application 210, the access management system 230, and the archive 240, the archive access system 200 provides secure access to users of the software application to the contents of the archive 240.

As mentioned earlier, at some point, whether manual or automatic and whether ad-hoc or periodic, the software application 210 requests that the archiving component 235 archive a plurality of objects in a database, such as a database managed by the database management system 250. At this time, the archiving component 235 attempts to archive that plurality of objects in the archive 240, beginning with an oldest object in the plurality of objects, and up to a maximum number of objects the archiving component 235 can process (the aforementioned limit). Any objects that the archiving component 235 is able to successfully archive in the archive 240 are then deleted from the database. However, some objects may not be able to be archived, such as if they are labeled with a "not allowed to be archived" label or the archiving component 235 otherwise determines that they cannot or should not be archived. The archiving component 235 keeps track of how many such objects it is unable to archive in response to the request from the software application 210. This number is stored by the archiving component as a paging amount.

On any subsequent request to archive from the software application 210, the archiving component 235, rather than beginning with the oldest object in the plurality of objects, instead skips over a number of objects in the plurality of objects equal to the paging amount. Thus, for example, if the paging amount is 10,950, then the archiving component 235 will begin with the $10,951^{st}$ oldest object in the plurality of objects rather than the $1^{st}$ oldest object. Any objects that the archiving component 235 is able to successfully archive in the archive 240 are then deleted from the database. However, for the objects, if any, that are not able to be archived, the archiving component 235 keeps track of how many such objects it is unable to archive in response to the request from the software application 210 and adds it to the paging amount, with the next request for archiving then using this new paging amount. If there gets to be a point where the archiving component 235 is able to process an archiving request without encountering any objects it is not able to archive, then the paging amount is reset to zero.

Figure 3:
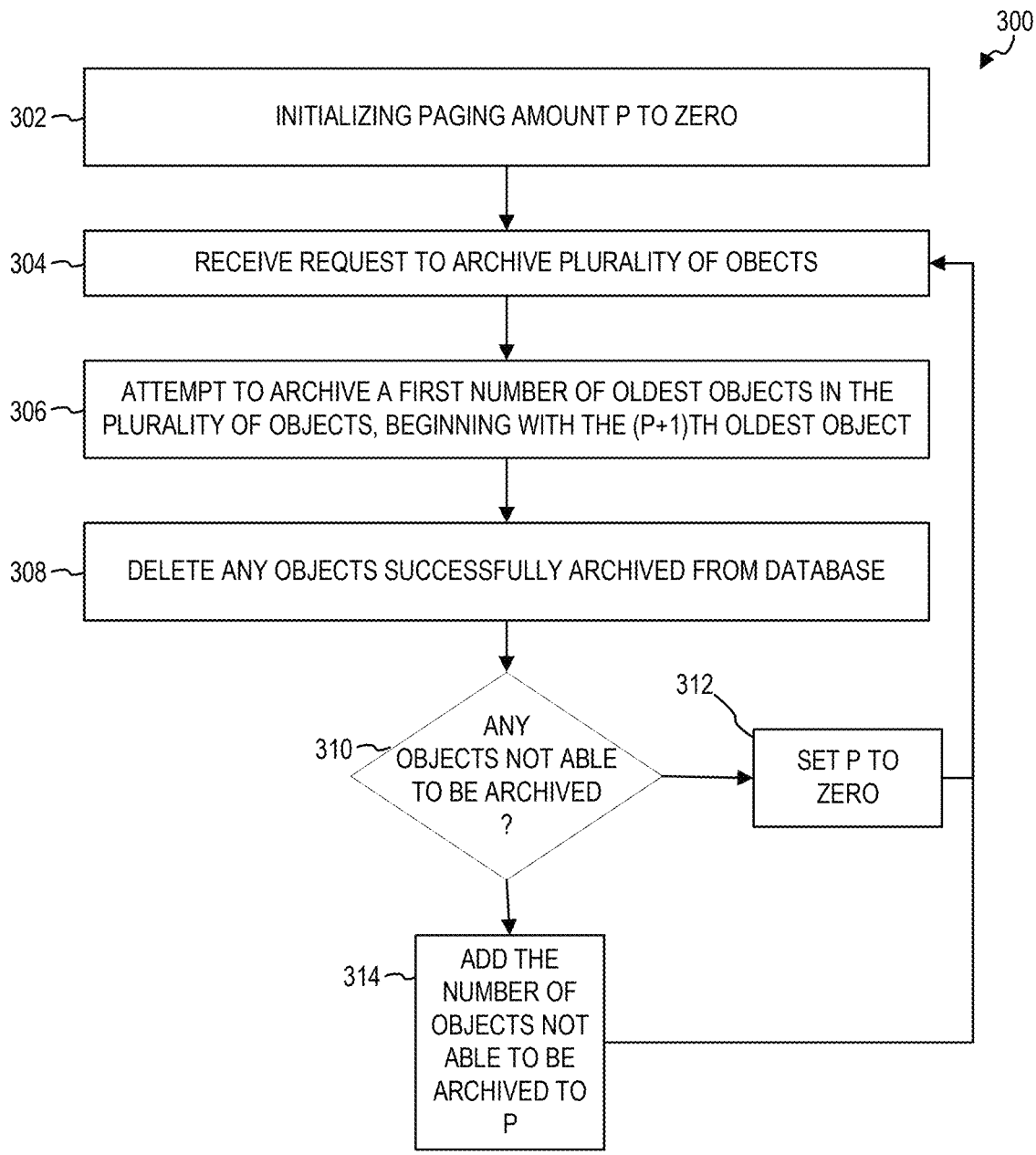
FIG. 3 is a flowchart illustrating an example method of archiving objects from a database, in accordance with an example embodiment.

FIG. 3 is a flowchart illustrating an example method 300 of archiving objects from a database, in accordance with an example embodiment. The method 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 300 are performed by the archiving system 200 of FIG. 2 or any combination of one or more of its components. For example, the operations of the method 300 may be performed by the archiving component 235.

At operation 302, a paging amount p is initialized to zero. At operation 304, the archiving component 235 may receive, from the software application 210, a first request to archive data from a database into an archive 240. The software application 210 may comprise an enterprise application. However, other types of software applications 210 are also within the scope of the present disclosure. The request may comprise an identification of a plurality of objects in the database to be archived. In some example embodiments, the identifications of the plurality of objects may be ordered in chronological order.

At operation 306, the archiving component 235 may then attempt to archive the plurality of objects, up to a limit number of objects, skipping over a number of oldest objects, if any, equal to p, in the plurality of objects. In the initial run or any other time where the paging amount is zero, this results in the oldest objects being attempted to be archived. In situations where the paging amount is higher than zero, however, then that paging amount number of oldest objects will be skipped and the attempt at archiving objects will only begin from the next most oldest object after that paging amount of objects. At operation 308, any objects that are successfully archived are deleted from the database. At operation 310, the archiving component 235 may determine if there are any objects, from the plurality of objects, that were not able to be archived. If not, then at operation 312 the paging amount is set to zero and the method 300 loops back to operation 304. If so, however, then the number of objects the archiving component 235 was unable to archive (in response to this particular request) is added to p at operation 314. Then the method 300 loops back to operation 304.

In view of the disclosure above, various examples are set forth below. It should be noted that one or more features of an example, taken in isolation or combination, should be considered within the disclosure of this application.

Example 1 is a system comprising: at least one hardware processor; a non-tangible computer-readable medium storing instructions that, when executed by the at least one hardware processor, cause the at least one hardware processor to perform operations, in a system where a paging amount p has been initialized to zero, the operations comprising: receiving a request to archive a plurality of objects stored in a database, each object having a corresponding date; attempting to archive a number of objects beginning with a (p+1)th oldest object in the plurality of objects; causing any objects that were successfully archived to be deleted from the database; in response to a determination that at least one object from the plurality of objects was not successfully processed, adding the number of unsuccessfully archived objects to p; and repeating the operations.

In Example 2, the subject matter of Example 1 comprises, wherein the operations further comprise: in response to a determination that the number of unsuccessfully archived objects from the number of objects is zero, resetting p to zero.

In Example 3, the subject matter of Examples 1-2 comprises, wherein the request identifies the plurality of objects stored in the database in chronological order by date.

In Example 4, the subject matter of Examples 1-3 comprises, wherein the number of objects is equal in quantity to a preset limit.

In Example 5, the subject matter of Examples 1-4 comprises, wherein archived objects are stored in an archive in binary large object (BLOB) format.

In Example 6, the subject matter of Examples 1-5 comprises, wherein the request is received from a software application on a periodic basis.

In Example 7, the subject matter of Example 6 comprises, wherein the software application comprises an enterprise application.

Example 8 is a method comprising: receiving a request to archive a plurality of objects stored in a database, each object having a corresponding date; attempting to archive a number of objects beginning with a (p+1)th oldest object in the plurality of objects; causing any objects that were successfully archived to be deleted from the database; in response to a determination that at least one object from the plurality of objects was not successfully processed, adding the number of unsuccessfully archived objects to p; and repeating the operations.

In Example 9, the subject matter of Example 8 comprises, in response to a determination that the number of unsuccessfully archived objects from the number of objects is zero, resetting p to zero.

In Example 10, the subject matter of Examples 8-9 comprises, wherein the request identifies the plurality of objects stored in the database in chronological order by date.

In Example 11, the subject matter of Examples 8-10 comprises, wherein the number of objects is equal in quantity to a preset limit.

In Example 12, the subject matter of Examples 8-11 comprises, wherein archived objects are stored in an archive in binary large object (BLOB) format.

In Example 13, the subject matter of Examples 8-12 comprises, wherein the request is received from a software application on a periodic basis.

In Example 14, the subject matter of Example 13 comprises, wherein the software application comprises an enterprise application.

Example 15 is a non-transitory machine-readable medium storing instructions which, when executed by one or more processors, cause the one or more processors to perform operations comprising: receiving a request to archive a plurality of objects stored in a database, each object having a corresponding date; attempting to archive a number of objects beginning with a (p+1)th oldest object in the plurality of objects; causing any objects that were successfully archived to be deleted from the database; in response to a determination that at least one object from the plurality of objects was not successfully processed, adding the number of unsuccessfully archived objects to p; and repeating the operations.

In Example 16, the subject matter of Example 15 comprises, wherein the operations further comprise: in response to a determination that the number of unsuccessfully archived objects from the number of objects is zero, resetting p to zero.

In Example 17, the subject matter of Examples 15-16 comprises, wherein the request identifies the plurality of objects stored in the database in chronological order by date.

In Example 18, the subject matter of Examples 15-17 comprises, wherein the number of objects is equal in quantity to a preset limit.

In Example 19, the subject matter of Examples 15-18 comprises, wherein archived objects are stored in an archive in binary large object (BLOB) format.

In Example 20, the subject matter of Examples 15-19 comprises, wherein the request is received from a software application on a periodic basis.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Certain embodiments are described herein as comprising logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 4:
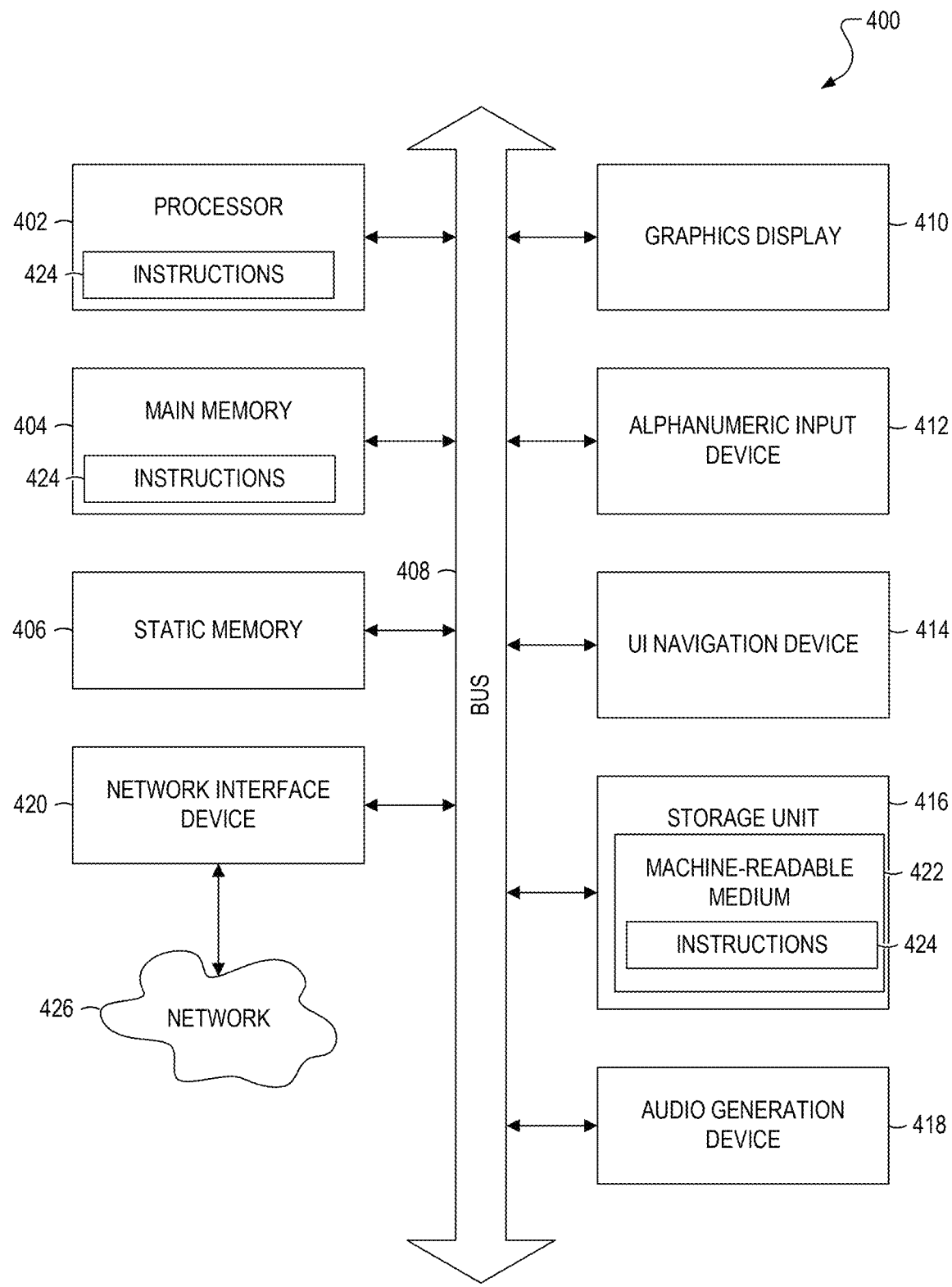
FIG. 4 is a block diagram of an example computer system on which methodologies described herein can be executed.

FIG. 4 is a block diagram of a machine in the example form of a computer system 400 within which instructions 424 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404, and a static memory 406, which communicate with each other via a bus 408. The computer system 400 may further include a graphics or video display unit 410 (e.g., a liquid crystal display (LCD) or a cathode ray tube (CRT)). The computer system 400 also includes an alphanumeric input device 412 (e.g., a keyboard), a user interface (UI) navigation (or cursor control) device 414 (e.g., a mouse), a storage unit (e.g., a disk drive unit) 416, an audio or signal generation device 418 (e.g., a speaker), and a network interface device 420.

The storage unit 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media. The instructions 424 may also reside, completely or at least partially, within the static memory 406.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   at least one hardware processor;
   a non-tangible computer-readable medium storing instructions that, when executed by the at least one hardware processor, cause the at least one hardware processor to perform operations, where a paging amount p has been initialized to zero, the operations comprising:
   receiving a request to archive a plurality of objects stored in a database, each object having a corresponding date;
   attempting to archive a number of objects beginning with a (p+1)th oldest object in the plurality of objects;
   causing any objects that were successfully archived to be deleted from the database;

in response to a determination that at least one object from the plurality of objects was not successfully processed, adding a quantity of unsuccessfully archived objects to p; and repeating the operations.

2. The system of claim 1, wherein the operations further comprise:

in response to a determination that the number of unsuccessfully archived objects from the number of objects is zero, resetting p to zero.

3. The system of claim 1, wherein the request identifies the plurality of objects stored in the database in chronological order by date.

4. The system of claim 1, wherein the number of objects is equal in quantity to a preset limit.

5. The system of claim 1, wherein archived objects are stored in an archive in binary large object (BLOB) format.

6. The system of claim 1, wherein the request is received from a software application on a periodic basis.

7. The system of claim 6, wherein the software application comprises an enterprise application.

8. A method, where a paging amount p has been initialized to zero, comprising:

receiving a request to archive a plurality of objects stored in a database, each object having a corresponding date;

attempting to archive a number of objects beginning with a (p+1)th oldest object in the plurality of objects;

causing any objects that were successfully archived to be deleted from the database;

in response to a determination that at least one object from the plurality of objects was not successfully processed, adding a quantity of unsuccessfully archived objects top; and repeating the operations.

9. The method of claim 8, further comprising:

in response to a determination that the number of unsuccessfully archived objects from the number of objects is zero, resetting p to zero.

10. The method of claim 8, wherein the request identifies the plurality of objects stored in the database in chronological order by date.

11. The method of claim 8, wherein the number of objects is equal in quantity to a preset limit.

12. The method of claim 8, wherein archived objects are stored in an archive in binary large object (BLOB) format.

13. The method of claim 8, wherein the request is received from a software application on a periodic basis.

14. The method of claim 13, wherein the software application comprises an enterprise application.

15. A non-transitory machine-readable medium storing instructions which, when executed by one or more processors, cause the one or more processors to perform operations, where a paging amount p has been initialized to zero, comprising:

receiving a request to archive a plurality of objects stored in a database, each object having a corresponding date;

attempting to archive a number of objects beginning with a (p+1)th oldest object in the plurality of objects;

causing any objects that were successfully archived to be deleted from the database;

in response to a determination that at least one object from the plurality of objects was not successfully processed, adding a quantity of unsuccessfully archived objects top; and repeating the operations.

16. The non-transitory machine-readable medium of claim 15, wherein the operations further comprise:

in response to a determination that the number of unsuccessfully archived objects from the number of objects is zero, resetting p to zero.

17. The non-transitory machine-readable medium of claim 15, wherein the request identifies the plurality of objects stored in the database in chronological order by date.

18. The non-transitory machine-readable medium of claim 15, wherein the number of objects is equal in quantity to a preset limit.

19. The non-transitory machine-readable medium of claim 15, wherein archived objects are stored in an archive in binary large object (BLOB) format.

20. The non-transitory machine-readable medium of claim 15, wherein the request is received from a software application on a periodic basis.

\* \* \* \* \*